(12) United States Patent
Ishida et al.

(10) Patent No.: US 8,668,620 B2
(45) Date of Patent: Mar. 11, 2014

(54) CAULKED RETAINING MEMBER, METHOD FOR RETAINING MEMBER BY CAULKING, STRUCTURE OF CAULKED RETAINING MEMBER, AND CAULKING APPARATUS

(75) Inventors: Takeshi Ishida, Nagakute-cho (JP); Taro Furukubo, Nagoya (JP)

(73) Assignee: Toyota Jidosha Kabushiki Kaisha, Aichi-ken (JP)

(*) Notice: Subject to any disclaimer, the term of this patent is extended or adjusted under 35 U.S.C. 154(b) by 1075 days.

(21) Appl. No.: 12/697,489

(22) Filed: Feb. 1, 2010

(65) Prior Publication Data

US 2010/0233395 A1    Sep. 16, 2010

(30) Foreign Application Priority Data

Mar. 13, 2009  (JP) ................ 2009-061488

(51) Int. Cl.
*F16C 35/067*  (2006.01)
(52) U.S. Cl.
USPC .......................................... 475/333; 123/321
(58) Field of Classification Search
USPC ................... 475/333; 123/321, 90.18
See application file for complete search history.

(56) References Cited

U.S. PATENT DOCUMENTS

| | | | | |
|---|---|---|---|---|
| 4,950,110 A * | 8/1990 | Suzuki | .......................... | 408/126 |
| 6,834,996 B2 * | 12/2004 | Gomyo et al. | ................ | 384/100 |
| 6,908,231 B2 * | 6/2005 | Hagiwara | ..................... | 384/537 |
| 7,160,030 B2 * | 1/2007 | You et al. | ...................... | 384/107 |
| 7,475,662 B2 * | 1/2009 | Suzuki et al. | ............. | 123/90.18 |
| 8,303,190 B2 * | 11/2012 | Shigeoka | ....................... | 384/544 |
| 2007/0137614 A1 * | 6/2007 | Tsuzuki | ....................... | 123/321 |
| 2007/0140611 A1 * | 6/2007 | Chifu et al. | .................... | 384/544 |
| 2008/0118197 A1 * | 5/2008 | Matsui et al. | ................ | 384/494 |
| 2008/0219608 A1 * | 9/2008 | Koma et al. | .................. | 384/448 |
| 2008/0273824 A1 * | 11/2008 | Inoue | ............................ | 384/544 |

FOREIGN PATENT DOCUMENTS

| | | |
|---|---|---|
| DE | 10 2006 015 581 B3 | 10/2007 |
| JP | 47-004369 U | 2/1972 |
| JP | 57-167925 U | 4/1982 |
| JP | 04-502798 A | 5/1992 |
| JP | 08-290224 A | 11/1996 |
| JP | 2001-162396 A | 6/2001 |
| JP | 2002-021867 A | 1/2002 |
| JP | 2002-035864 A | 2/2002 |
| JP | 2005-034857 A | 2/2005 |
| JP | 2007-303408 A | 11/2007 |
| JP | 2007-303479 A | 11/2007 |
| JP | 2008-223840 A | 9/2008 |

OTHER PUBLICATIONS

Partial translation of German Office Action for corresponding DE Patent Application No. 10 2010 002 156.3 issued on Sep. 10, 2012.
JP 2009-061488 Office Action dated Feb. 21, 2010.

* cited by examiner

*Primary Examiner* — Sherry Estremsky
(74) *Attorney, Agent, or Firm* — Sughrue Mion, PLLC

(57) ABSTRACT

During a caulking process, a pressure is applied to a pressure receiving shoulder portion in the same direction as a direction of a clamping force generated by a caulking portion. The clamping force for holding an outer race can thereby be increased. Also, a pressure receiving surface of the pressure receiving shoulder portion is set higher than an end face. Thus, no pressure resulting from plastic deformation in a direction perpendicular to the direction of the clamping force of the caulking portion is generated. In addition, a groove is formed between the pressure receiving shoulder portion and an end serving as the caulking portion.

11 Claims, 12 Drawing Sheets

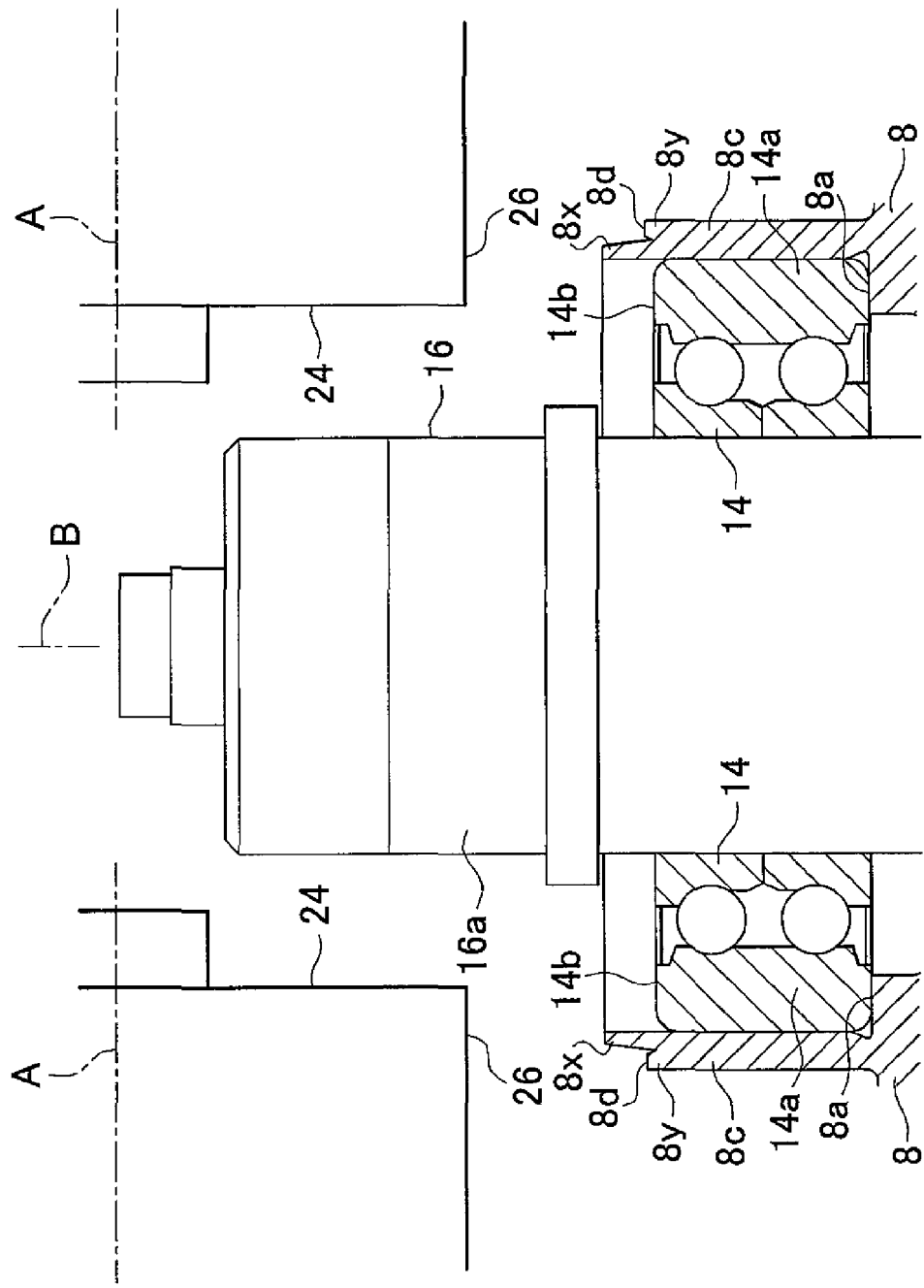

CAULKED RETAINING MEMBER, METHOD FOR RETAINING MEMBER BY CAULKING, STRUCTURE OF CAULKED RETAINING MEMBER, AND CAULKING APPARATUS

INCORPORATION BY REFERENCE

The disclosure of Japanese Patent Application No. 2009-061488 filed on Mar. 13, 2009 including the specification, drawings and abstract is incorporated herein by reference in its entirety.

BACKGROUND OF THE INVENTION

1. Field of the Invention

The invention relates to a caulked retaining member, one end of which is bent through a calking process to form a caulked portion, that holds a member along a base of the caulked retaining member through the clamping force of the caulked portion, a method for retaining a member by caulking, a structure of a caulked retaining member, and a caulking apparatus for a caulking process.

2. Description of the Related Art

There is known a rotation-translation conversion actuator that is mounted in an internal combustion engine or the like to apply a translational driving force to the engine (e.g., see Japanese Patent Application Publication No. 2007-303408 (JP-A-2007-303408) and Japanese Patent Application Publication No. 2007-303479 (JP-A-2007-303479)). The publications, JP-A-2007-303408 and JP-A-2007-303479 each describe a rotation-translation conversion actuator that drives a valve lift device of an internal combustion engine. A rotary body is rotatably supported in the main body case of the rotation-translation conversion actuator via a bearing. The rotary body is rotationally driven by a motor. Thus, a screw shaft makes a translational movement in an axial direction to drive the valve lift device.

In JP-A-2007-303408 and JP-A-2007-303479, an annular support member is arranged inside the housing and bolted to an inner surface of the housing to fix the bearing for rotatably supporting the rotary body in the housing.

However, due to the configuration in which the annular support member is arranged inside the housing and fastened by the bolt to fix the bearing as described above, the housing tends to be large. In order to prevent the housing from increasing in size, a method of supporting the bearing through a caulking process instead of using the annular support member or bolting the annular support member.

However, if the housing is simply caulked and the bearing is clamped in the housing in the case where a member requiring a certain clamping force, such as the bearing or the like, is held by the housing, the residual axial force of the housing as a force serving to generate the clamping force cannot be sufficiently increased. As a result, the clamping force for holding the bearing may become insufficient. In order to increase the residual axial force, it is conceivable to apply a pressure to a base of a work in the same direction as the direction of the clamping force apart from a position where the work is bent through the caulking process.

However, in the caulking process for the bearing as described above, the rotational resistance of the bearing needs to be held small. For this purpose, the application of the pressure for increasing the residual axial force needs to be prevented from increasing in the radial strain of the bearing.

As a caulking process for other purposes, there are known an art in which the inflexion point of a change rate of a pressure exerted by an electric press is set as a completion point of the press operation (see Japanese Patent Application Publication No. 2001-162396 (JP-A-2001-162396)) and an art in which an inflexion point corresponding to a decrease in the caulking load of a caulking punch is detected based on the relationship between the caulking load and a caulking stroke of the caulking punch to control the amount of a material with which a groove is filled (see Japanese Patent Application Publication No. 2002-35864 (JP-A-2002-35864)).

In addition, conventionally a groove is formed between a caulking portion of a workpiece and a contour region of the workpiece to prevent a caulking process from affecting the contour of the work (see Japanese Patent Application Publication No. 2005-34857 (JP-A-2005-34857)). Further, there are known an art in which a load is applied to a bearing side to increase the clamping force resulting from caulking (see Japanese Patent Application Publication No. 2008-223840 (JP-A-2008-223840)), and an art in which a spherical bearing is fixed to a housing by tumbling one of both sides separated from each other by a V-shaped groove (see Japanese Patent Application Publication No. 2002-21867 (JP-A-2002-21867)).

If a configuration is adopted in which a held member, such as a bearing or the like, is held by a caulked portion by applying pressure to the base of a workpiece in the same direction as the direction of a clamping force without applying pressure to the caulking portion, it is conceivable to further combine with this caulking process the method in which the inflexion point of the pressurization force is set as the completion point of the press operation as described in JP-A-2001-162396. However, even if this method is combined with the caulking process, it is unclear whether the member such as the bearing or the like may be restrained from being radially strained as the method described in JP-A-2001-162396 is put into practice in the caulking process.

This also holds true where the art of the caulking punch described in JP-A-2002-35864 is applied. It is unclear whether the member such as the bearing or the like is restrained from being radially strained through the caulking punching.

Furthermore, in JP-A-2005-34857, JP-A-2008-223840, and JP-A-2002-21867, when caulking part of the workpiece onto the member such as the bearing or the like, no consideration is given to the idea of restraining the member from being radially strained.

SUMMARY OF THE INVENTION

The invention restrains a member from being radially strained through application of a pressure to a base of a caulked retaining member in the same direction as the direction of a clamping force apart from the caulking portion in a configuration in which a held member is held by a caulked portion.

A first aspect of the invention relates to caulked retaining member that is bent at one end through a caulking process to form a caulked portion and holds a member along a base of the caulked retaining member by a clamping force of the caulked portion. In the caulked retaining member, the base has a pressure receiving shoulder portion, which receives a pressure in a same direction as a direction of the clamping force, and is formed coaxially on the outside of a bent side of the end, and a groove is formed between the end and the pressure receiving shoulder portion.

By using the caulked retaining member that includes the pressure receiving shoulder portion formed on the base thereof, the pressure can be applied with the aid of the pressure receiving shoulder portion during the caulking process of the end. Also, the groove is formed between the pressure receiving shoulder portion to which the pressure is thus applied and the end serving as the caulked portion.

Thus, during the caulking process to bend the end, even when the pressure is applied to the pressure receiving shoulder portion simultaneously and causes deformation, especially plastic deformation, the groove absorbs plastic flow. In this case, the groove especially absorbs plastic flow from a member on the pressure receiving shoulder portion side to a member on the end side, that is, plastic flow toward the member. Accordingly, the caulked portion side can be prevented from being radially strained in accordance with deformation of the pressure receiving shoulder portion after the caulking process.

Thus, in the construction in which the held member is held by the caulked portion by applying the pressure to the base of the caulked retaining member in the same direction as the direction of the clamping force apart from the caulked portion, the member can be restrained from being radially strained through application of the pressure.

A second aspect of the invention relates to a caulked retaining member that has an end thereof bent through a caulking process to form a caulked portion and holds a member along a base of the caulked retaining member by a clamping force of this caulked portion. In this caulked retaining member, the base has a pressure receiving shoulder portion, which receives a pressure in a same direction as a direction of the clamping force, and is formed coaxially on the outside of a bent side of the end, and the pressure receiving shoulder portion has a pressure receiving surface set at such a position that no pressure is applied to the member as a result of plastic deformation of the caulked portion in a direction perpendicular to a direction of the clamping force.

By using the caulked retaining member having the pressure receiving shoulder portion formed on the base thereof as in the case of the foregoing first aspect of the invention, the pressure can be applied with the aid of the pressure receiving shoulder portion during the caulking process of the end. According to the second aspect of the invention, the pressure receiving surface of the pressure receiving shoulder portion is set at such a position that no pressure is applied to the member as a result of plastic deformation of the caulked portion in the direction perpendicular to the direction of the clamping force.

Thus, during the caulking process to bend the end, even when the pressure is applied to the pressure receiving shoulder portion simultaneously and causes plastic deformation, this plastic deformation allows no pressure to be applied to the member in the direction perpendicular to the direction of the clamping force. Thus, the caulked portion side can be prevented from being radially strained in accordance with deformation of the pressure receiving shoulder portion after the caulking process.

Thus, in the construction in which the member is held by the caulked portion by applying the pressure to the base of the work in the same direction as the direction of the clamping force apart from the caulking portion, the held member can be restrained from being radially strained through application of the pressure.

A third aspect of the invention relates to a method for retaining a member by caulking. This method includes bending an end of a caulked retaining member along a corner portion of the member by a caulking surface of a caulking roller and the member is held along a base of the work by a clamping force of this caulking portion, and applying a pressure to the pressure receiving shoulder portion in the same direction as the direction of the clamping force during this caulking process.

According to the foregoing aspect of the invention, even when plastic deformation results from the pressure applied to the pressure receiving shoulder portion in the same direction as the direction of the clamping force through the caulking process of the above-described caulked retaining member by the caulking roller during this caulking process, the caulked portion side can be prevented from being radially strained in accordance with deformation of the pressure receiving shoulder portion after the caulking process, and the member can be restrained from being radially strained.

A fourth aspect of the invention relates to a method for retaining a member by caulking. The method includes: bending an end of a workpiece along a corner portion of the member by a caulking surface of a caulking roller; applying a pressure to a pressure receiving shoulder portion, which is formed coaxially on the outside of a bent side of the end of the workpiece, in a same direction as a caulking pressure applied to the caulking surface so that a caulking process is performed to form a caulked portion, and the member is held along a base of the workpiece by a clamping force of the caulked portion; and setting a timing for starting a caulking end process to a timing when a caulking load applied to the caulking roller during the caulking process or a caulking torque for rolling the caulking roller undergoes a specific change indicating that the member begins to be strained.

By setting as the timing for starting the caulking process end processing the timing when the caulking load or the caulking torque undergoes a specific change indicating that the member begins to be strained as described above, the caulking process can be ended prior to an increase in the amount of plastic deformation resulting from application of a pressure to the pressure receiving shoulder portion even when the pressure is applied to the pressure receiving shoulder portion during the bending of the end through the caulking process.

Thus, the caulked portion side can be prevented from being strained in the direction of the member in accordance with plastic deformation of the pressure receiving shoulder portion after the caulking process. Thus, in the construction in which the member is held by the caulked portion by applying the pressure to the base of the caulked retaining member in the same direction as the direction of the clamping force apart from the caulked portion, the held member can be restrained from being radially strained through application of the pressure.

A fifth aspect of the invention relates to a caulking apparatus that bends an end of a workpiece along a corner portion of a member by a caulking surface of a caulking roller, applies a pressure to a pressure receiving shoulder portion, which is formed opposite a bent side of the end, in a same direction as a caulking pressure applied to the caulking surface to thereby carry out a caulking process and hence form a caulked portion, and carries out a caulking process of holding the member along a base of the workpiece by a clamping force of the caulked portion. The caulking apparatus is equipped with a workpiece mount, a rolling pressurization unit that presses the workpiece arranged on the workpiece mount as the caulking roller is rolled over the workpiece, a caulking process load state detection unit that detects a caulking process load applied by the caulking roller, a specific change detection unit that detects a specific change in the caulking process load detected by the caulking process load state detection unit that indicates the held member begins to be strained, and a caulking process changing unit that changes a caulking process for the workpiece on a basis of a timing at which the specific change detection unit detects the specific change.

When the specific change detection unit detects that the caulking process load state undergoes a specific change indicating that the member begins to be strained during the caulking process by the rolling pressurization unit, the caulking process changing unit changes the caulking process for the workpiece on the basis of the timing when an occurrence of this specific change is detected.

The caulking process is changed by, for example, reducing the pressure for the caulking process or stopping the caulking process itself. Thus, the amount of plastic deformation can be prevented from increasing through application of a pressure to the pressure receiving shoulder portion.

Thus, in the caulking apparatus that applies a pressure to the base of the workpiece in the same direction as the direction of the clamping force apart from the caulked portion to hold the member by the caulked portion, the member can be restrained from being radially strained through application of the pressure.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 5 is an explanatory view of the arrangement of a caulking roller and the bearing holder according to the first embodiment of the invention;

DETAILED DESCRIPTION OF EMBODIMENTS

Figure 1:
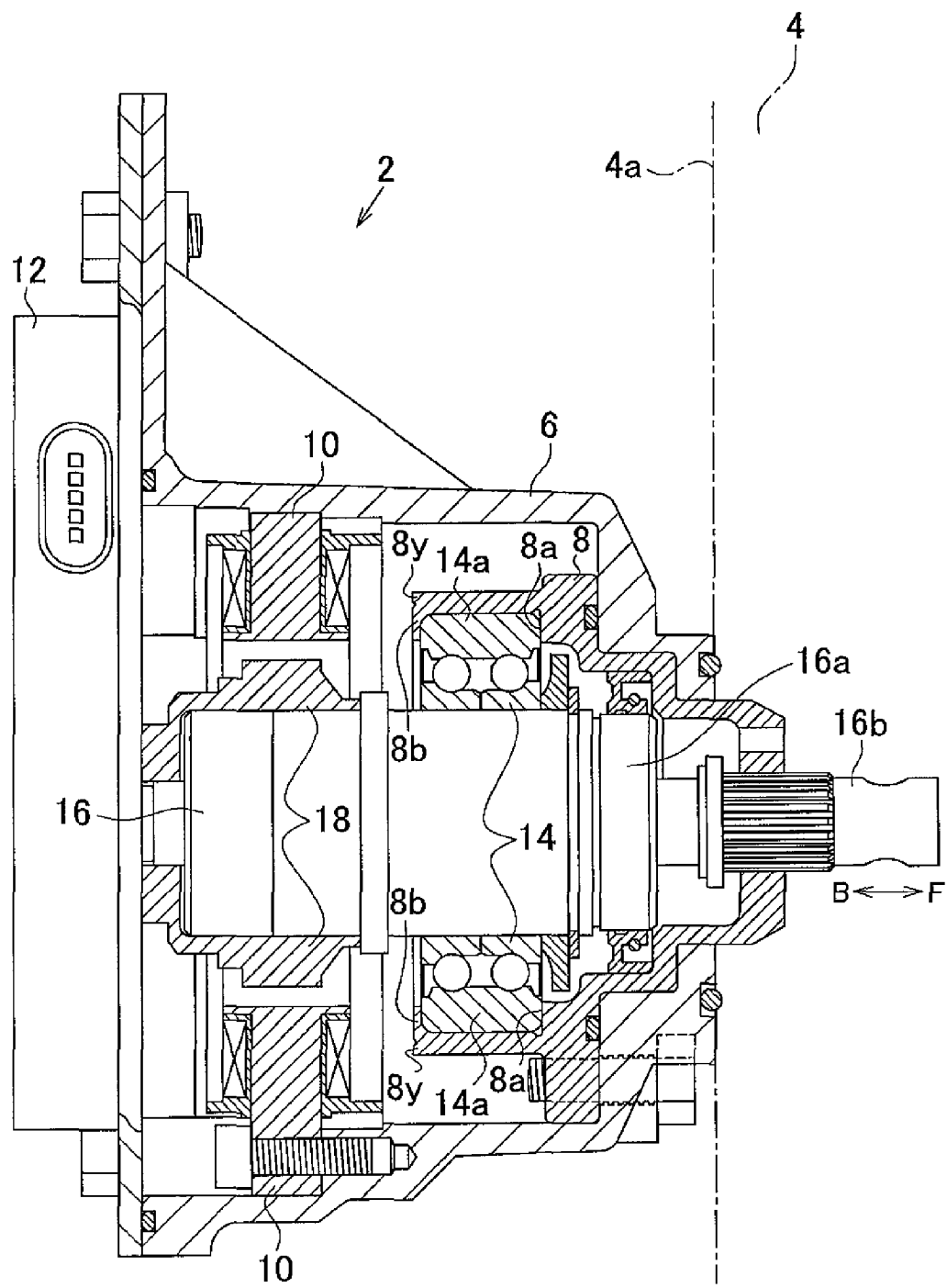
FIG. 1 is a longitudinal sectional view of a rotation-translation conversion actuator according to the first embodiment of the invention.

A longitudinal sectional view of FIG. 1 represents the construction of a rotation-translation conversion actuator (hereinafter referred to as "the actuator") 2 to which the invention is applied. The actuator 2 may be mounted on an outer surface of a cylinder head or cam carrier of an internal combustion engine as a driven object device. In particular, the actuator 2 drives a variable valve operating mechanism mounted on a cylinder head, and adjusts the axial position of a control shaft installed in the variable valve operating mechanism. It should be noted herein that the actuator 2 is mounted on an outer peripheral surface 4a of a cam carrier 4 as indicated by alternate long and short dash lines.

In a housing 6, constituting a body of the actuator 2, a bearing holder 8 is bolted from the front of the actuator housing 6 (on an F side in FIG. 1) and a stator 10 is bolted from the rear of the actuator housing 6 (on a B side in FIG. 1). A control panel 12 is bolted to the rear of the housing 6. The housing 6 is thereby closed.

Inside the bearing holder 8, a bearing 14 (corresponding to the member) is retained on a rear side of the bearing holder 8 by a caulked portion 8b, which is formed through a caulking process as will be described later. The bearing holder 8 rotatably supports, via the bearing 14, a nut 16a that constitutes an outer periphery of a planetary differential screw type rotation-translation converter 16.

Figure 2:
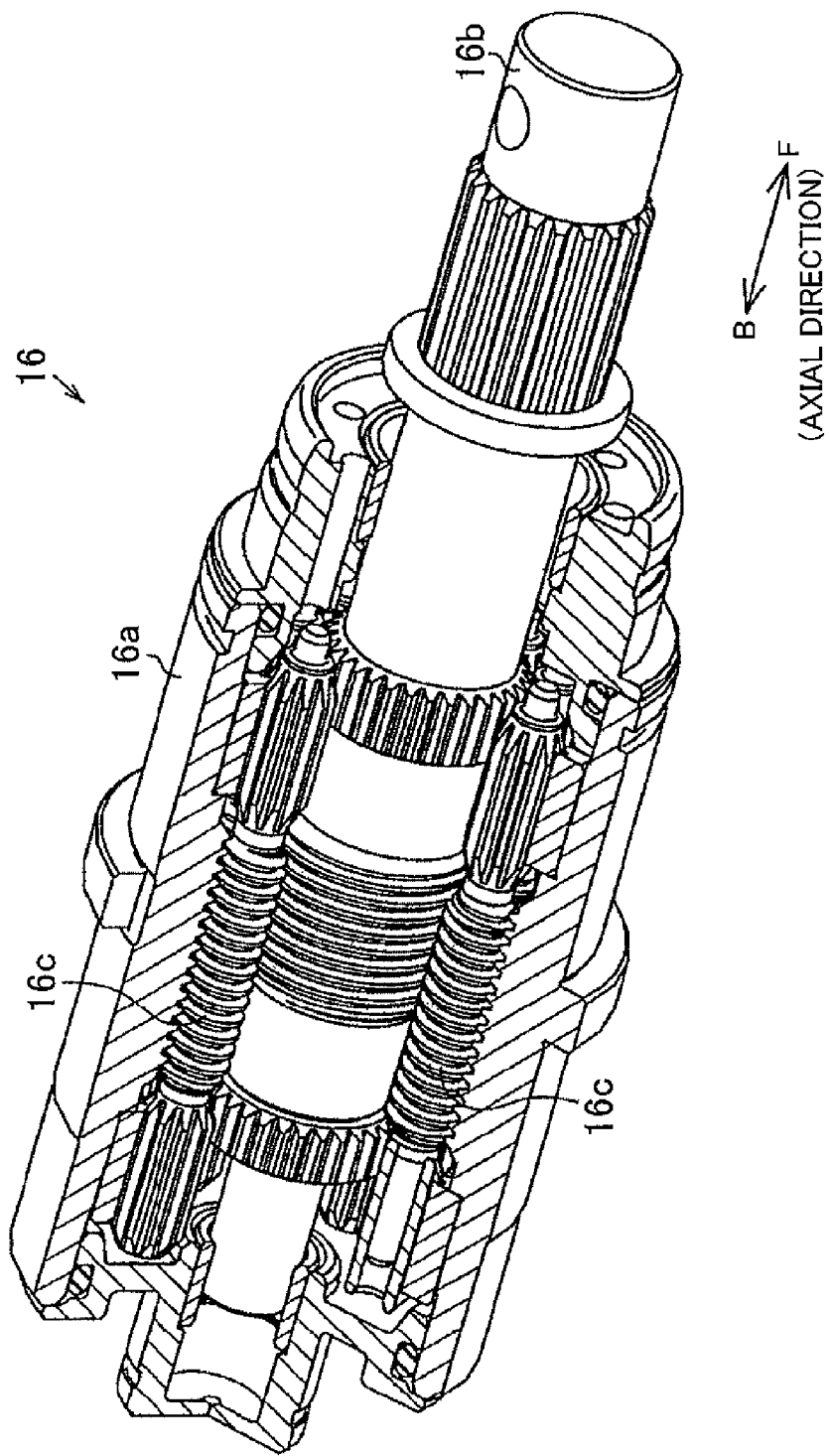
FIG. 2 is a partially cutaway perspective view of a planetary differential screw type rotation-translation converter employed in the rotation-translation conversion actuator.

The planetary differential screw type rotation-translation converter 16 is provided in the internal space of the housing 6 along the entire axial length of the housing 6. As shown in a partially cutaway perspective view of FIG. 2, the planetary differential screw type rotation-translation converter 16 is includes the nut 16a (corresponding to the rotary member), an output shaft 16b (corresponding to the sun shaft), and a planetary shaft 16c arranged between the nut 16a and the output shaft 16b. The nut 16a meshes with the planetary shaft 16c. By the same token, the planetary shaft 16c also meshes with the output shaft 16b.

As shown in FIG. 1, a rotor 18 is press-fitted to the rear of the nut 16a. The rotor 18 is driven via the stator 10 in response to a drive signal from the control panel 12, and the nut 16a thereby rotates around its own axis. Due to rotation of this nut 16a, the planetary shaft 16c revolves around the output shaft 16b while rotating around its own axis. A screw differential effect is created through rotation of this planetary shaft 16e around its own axis and revolution around the output shaft 16b. Due to this screw differential effect, the output shaft 16b, which is spline-fitted to a tip of the bearing holder 8 to prevent the output shaft 16b from rotating around its own axis, moves in an axial direction (in an direction of arrows F-B). In accordance with the movement of this output shaft 16b in the axial direction, the control shaft of the variable valve operating mechanism located in the space within the cam carrier 4 moves in the axial direction, and the maximum valve lift amount of an intake valve in each cylinder of the internal combustion engine may be continuously adjusted through this movement. Thus, the intake air amount of the internal combustion engine can be continuously adjusted without using a throttle valve.

As shown in FIG. 1, the bearing 14 supporting the entire planetary differential screw type rotation-translation converter 16 includes an outer race 14a that is sandwiched in the axial direction between an abutment surface 8a formed inside the bearing holder 8 and the caulked portion 8b at the rear end. Thus, the entire planetary differential screw type rotation-translation converter 16 is held at a predetermined position in the housing 6 by the bearing holder 8.

Figure 3:
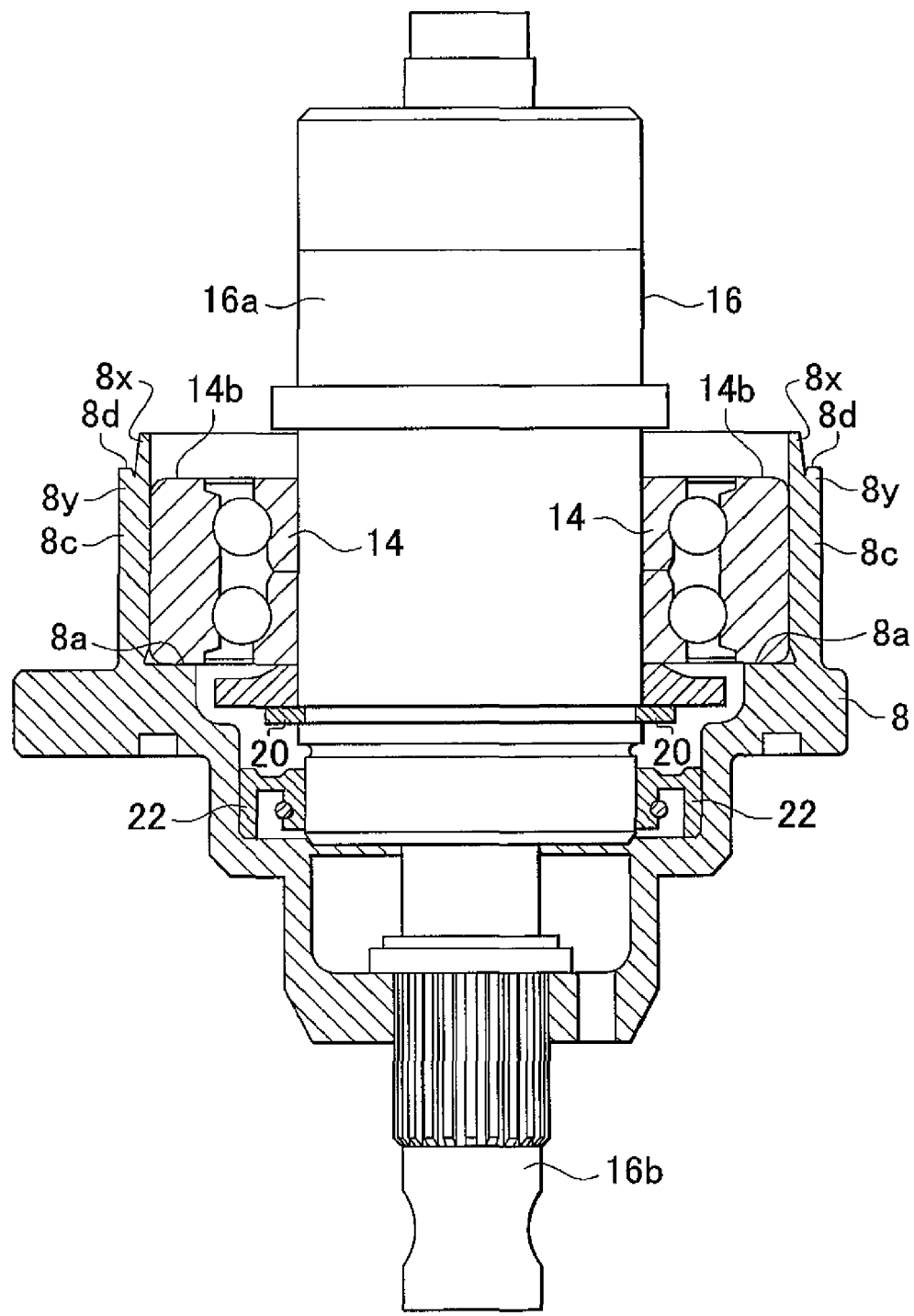
FIG. 3 is a longitudinal sectional view showing an assembled rotation-translation conversion actuator according to the first embodiment of the invention, before caulking.

The caulking process for forming the caulked portion 8b will now be described. FIG. 3 shows a cross-sectional view of an assembled rotation-translation conversion actuator before caulking. Before caulking, an end 8x on the rear end of the bearing holder 8 (corresponding to the caulked retaining member) assumes a cylindrically rising shape forms a cylindrical projection. Accordingly, the bearing holder 8 is open on the rear end, and the planetary differential screw type rotation-translation converter 16 is inserted in the bearing holder 8 from the rear of the bearing holder 8. Before insertion, the planetary differential screw type rotation-translation converter 16 is fixed by a snap ring 20 with the bearing 14 fitted to the outer periphery of the nut 16a. In addition, a seal ring 22 is also inserted from the rear end of the bearing holder 8 to be arranged at a predetermined position. It should be noted that the seal ring 22 is first fitted to the planetary differential screw type rotation-translation converter 16 in advance and then inserted the insertion of the planetary differential screw type rotation-translation converter 16.

Figure 4:
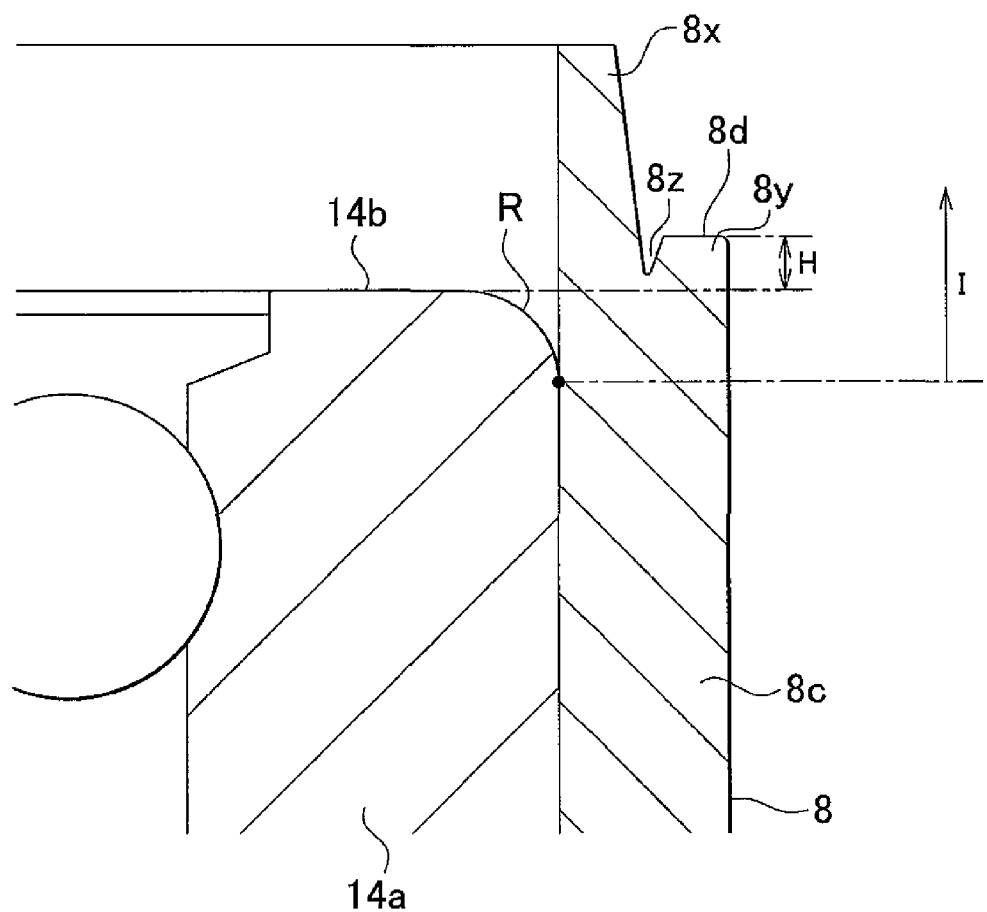
FIG. 4 is a sectional view showing the shape of the tip portion of a bearing holder according to the first embodiment of the invention before it is caulked.

In FIG. 4, a partially enlarged view of the rear end of the bearing holder 8 is shown. In addition to the end 8x, a pressure receiving shoulder portion 8y, which receives a pressure in the same direction as the direction of a clamping force exerted by the caulked portion 8b shown in FIG. 1 (the form of the end 8x subjected to the caulking process), is formed on the rear end of a peripheral wall portion 8c of the bearing holder 8 (corresponding to a base of the bearing holder 8) on an outer periphery side of the peripheral wall portion 8c outside of the end 8x, which is formed on the inner periphery side of the peripheral wall portion 8c in this case. A groove 8z with a V-shaped cross-section is formed between the end 8x and the pressure receiving shoulder portion 8y.

In bending the end 8x toward the bearing 14 along a corner portion of the bearing 14 through the caulking process, the pressure exerted on the bearing 14 by the caulked portion 8b (the end 8x) in the same direction as the direction of the clamping force is also applied to a pressure receiving surface 8d that is a tip surface of the pressure receiving shoulder portion 8y, especially in the final stage of the bending of the end 8x. The pressure receiving surface 8d is set higher than an end surface 14b of the bearing 14 by a height H.

The configuration shown in FIG. 3 is arranged in a roll caulking apparatus to subject the end 8x to a caulking process by two caulking rollers 24 as shown in FIG. 5. The two caulking rollers 24 are arranged around an axis B of the bearing holder 8 at phase intervals of 180°, and are rotated around axes of rotation A respectively. It should be noted in FIG. 5 that the axes of rotation A of the caulking rollers 24 and the axis B of the bearing holder 8 are shown parallel to the sheet of the drawing. The axes of rotation A are perpendicular to the axis B.

Figure 6A:
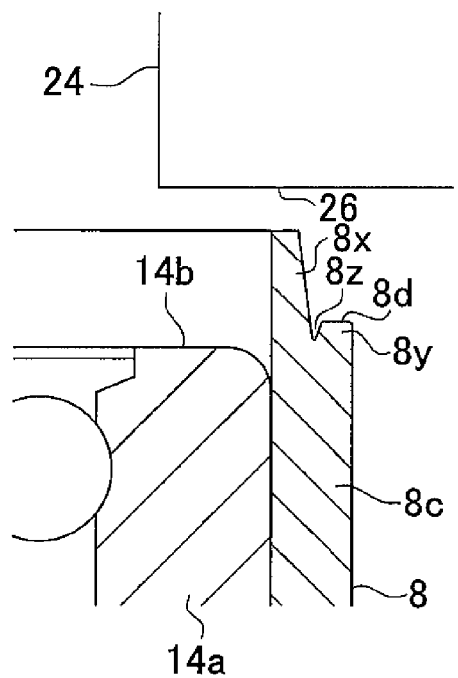
FIG. 6 is an explanatory view of the caulking process according to the first embodiment of the invention.
Figure 6B:
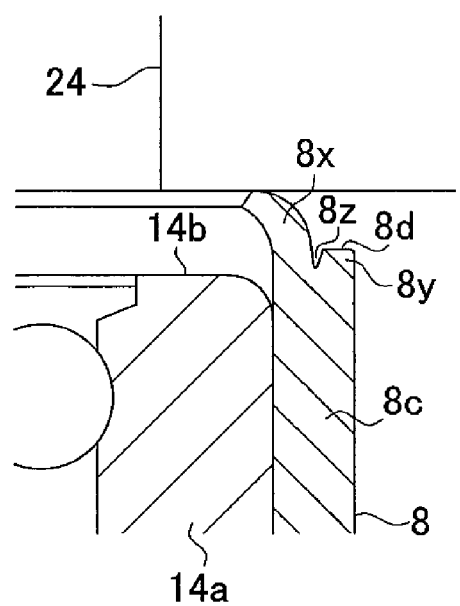

These caulking rollers 24 have stepless cylindrical outer peripheral surfaces, a portion of which are used as caulking surfaces 26. The rollers 24 are rotated around their own axes of rotation A respectively, and at the same time, revolve around the axis B of the bearing holder 8. The rollers 24 are thus rolled to press the end 8x on the caulking surfaces 26 formed on the rollers 24 from the state shown in FIG. 6A to that shown in FIG. 6B, and the end 8x begins bending toward the inner periphery side of the bearing holder 8 along the end surface 14b of the outer race 14a.

Figure 6C:
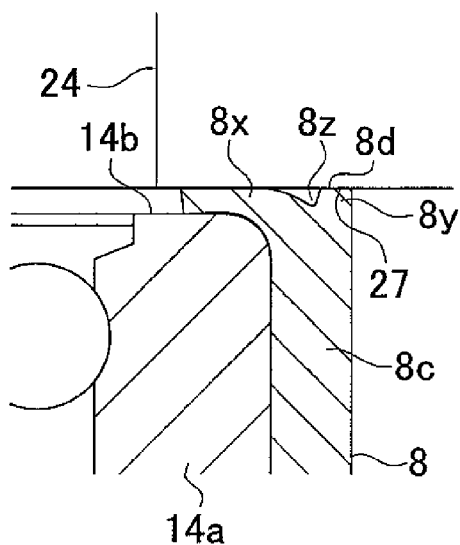

Immediately before the end of the caulking process, the regions 27 of the outer peripheral surfaces of the rollers 24 that are adjacent to the caulking surfaces 26 respectively abut on the pressure receiving surface 8d of the pressure receiving shoulder portion 8y as shown in FIG. 6C. Thus, a pressure is applied to the pressure receiving shoulder portion 8y from the rollers 24. The pressure is applied in the same direction as the direction of a clamping force (in the axial direction of the bearing holder 8 in this case) so that the end 8x is eventually caulked into the caulked portion 8b to clamp the bearing 14.

Figure 6D:
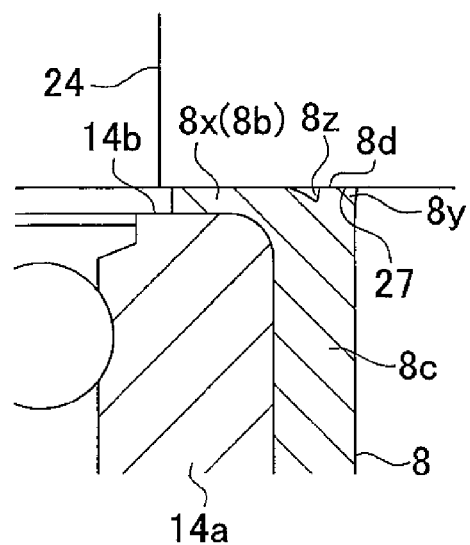

The rollers 24 then press the pressure receiving shoulder portion 8y to cause plastic deformation while bending the end 8x. Thus, as shown in FIG. 6D, the end 8x eventually serves as the caulked portion 8b to clamp the end surface 14b of the bearing 14, and the caulking process is hence completed.

In the caulking process as described above, the caulking surfaces 26 apply pressure to the peripheral wall portion 8c, which is not to be bent, from the end 8x side in a direction along the axis B (FIG. 5) (in the direction of the clamping force). However, the regions 27 adjacent to the caulking surfaces 26 press the pressure receiving shoulder portion 8y as described above, and the pressure is thereby applied to the peripheral wall portion 8c in the same direction from the pressure receiving shoulder portion 8y as well.

Accordingly, the peripheral wall portion 8c undergoes elastic deformation and plastic deformation during deformation of the end 8x during the caulking process. The ratio of the amount of plastic deformation increases due to the pressure from the pressure receiving shoulder portion 8y, and the amount of elastic deformation decreases correspondingly. It should be noted that the outer race 14a of the bearing 14, which receives a pressure from the end surface 14b via the end 8x (which becomes the caulked portion 8b after the caulking process) during the caulking process, is made of a hard material and undergoes elastic deformation only. For example, although both the bearing holder 8 and the outer race 14a are made of steels, the steel of the outer race 14a is harder than the steel of the bearing holder 8. For example, the bearing holder 8 may be made of a conventional stainless steel or the like, and the outer race 14a is made of a hard steel such as high-carbon chrome steel or the like.

Due to a difference between the amount of elastic deformation of the outer race 14a of this bearing 14 and the amount of elastic deformation of the peripheral wall portion 8c of the bearing holder 8, a residual axial force is generated in the bearing holder 8 after the caulking process. Especially due to pressure of the pressure receiving shoulder portion 8y by the regions 27 adjacent to the caulking surfaces 26 of the rollers 24, the amount of plastic flow on the peripheral wall portion 8c side increases, and the residual axial force thereby increases. Because the residual axial force thus increased, the outer race 14a receives a clamping pressure from the caulked portion 8b while abutting on the abutment surface 8a, and the entire bearing 14 is reliably held in the bearing holder 8. Thus, the nut 16a of the planetary differential screw type rotation-translation converter 16 is rotatably supported in the bearing holder 8.

In the caulking process, plastic deformation resulting from press of the pressure receiving shoulder portion 8y causes the peripheral wall portion 8c to bulge toward the inner periphery side as well as toward the outer periphery side. In this embodiment of the invention, the peripheral wall portion 8c is prevented from bulging toward this inner periphery side according to two methods.

In the first method, as shown in FIG. 4, the pressure receiving surface 8d of the pressure receiving shoulder portion 8y is set higher than the end surface 14b of the outer race 14a of the bearing 14. Thus, the bulge formed in the peripheral wall portion 8c, toward the inner periphery side, due to plastic deformation caused by transmission of a pressure toward the inner periphery is absorbed by a range I shown in FIG. 4 so that the pressure does not deform the outer race 14a of the bearing 14 inward. The range I is obtained by adding a range where the outer race 14a of the bearing 14 is spaced apart from an inner surface of the bearing holder 8 to a range higher than the end surface 14b of the outer race 14a. In this embodiment of the invention, the range I is higher than a rounded region R of the corner portion of the outer race 14a.

In the second method, the groove 8z exists between the end 8x and the pressure receiving shoulder portion 8y. Thus, even if the pressure is transmitted to the inner periphery side, most of the plastic deformation resulting from the transmission of the pressure is absorbed by the groove 8z.

Thus, pressure of the pressure receiving shoulder portion 8y does not cause the bearing 14 located in the bearing holder 8 to be strained radially inward after the caulking process, and does not affect the rotational resistance of the nut 16a of the planetary differential screw type rotation-translation converter 16.

According to the first embodiment of the invention in which a method for retaining a member by caulking and a structure of caulked retaining member are realized with the aid of the caulked retaining member as described above, the following effects are obtained. 1) in subjecting the end 8x of the bearing holder 8 to the caulking process, the pressure is applied to the pressure receiving shoulder portion 8y in the same direction as the direction of the clamping force generated by the caulked portion 8b. Thus, as described above, the residual axial force in the bearing holder 8 is larger after the completion of the described caulking process than in the case of a conventional caulking process. Thus, the clamping force for holding the outer race 14a may be increased.

In addition, the pressure receiving surface 8d of the pressure receiving shoulder portion 8y is set higher than the end surface 14b of the outer race 14a. Thus, no pressure results from plastic deformation of the caulked portion 8b in the direction perpendicular to the direction of the clamping force. In addition, the groove 8z is formed between the pressure receiving shoulder portion 8y and the end 8x serving as the caulked portion 8b. Due to these, even when plastic deformation occurs through application of the pressure to the pressure receiving shoulder portion 8y simultaneously with the bending of the end 8x through the caulking process as described above, plastic flow does not affect the bearing 14 side. Thus, the bearing 14 is restrained from being radially strained, namely, from being so strained as to increase the rotational resistance thereof in accordance with deformation of the pressure receiving shoulder portion 8y during the caulking process.

2) The invention is applied to the caulking process in which the bearing 14 for rotatably supporting the planetary differential screw type rotation-translation converter 16 is arranged in the bearing holder 8. Therefore, a large residual axial force may be set for the bearing holder 8, and the bearing 14 may be reliably held while being prevented from being radially strained. As a result, the size of the actuator may be reduced, and energy for driving the actuator can be conserved. In particular, because the driven object device is an internal combustion engine, size reduction and energy conservation are made possible for the internal combustion engine, and fuel economy is improved.

3) The same rollers 24 are used to subject the end 8x of the bearing holder 8 to the caulking process and apply the pressure to the pressure receiving shoulder portion 8y of the bearing holder 8. In addition, the rollers 24 are formed as stepless cylindrical surfaces. Thus, the caulking process may be efficiently carried out using a simple configuration. Furthermore, the shape of the rollers 24 is simplified, so it becomes easy to reduce the cost of the caulking apparatus and increase the accuracy in caulking the bearing holder 8.

Figure 7A:
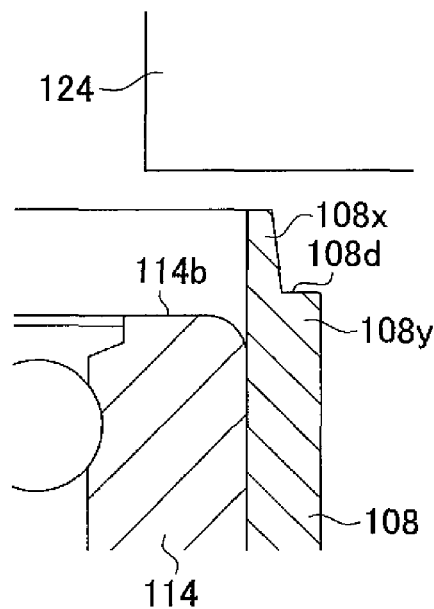
FIG. 7 is an explanatory view of the caulking process according to the second embodiment of the invention.

In the second embodiment of the invention, as shown in FIG. 7A, a bearing holder 108 has an end 108x serving as a caulked portion 108b after a caulking process, and a pressure receiving shoulder portion 108y having a pressure receiving surface 108d formed on an outer periphery side with respect to the end 108x. However, a groove or the like is not provided between the end 108x and the pressure receiving shoulder portion 108y. The second embodiment of the invention is identical to the first embodiment of the invention in other structural details.

Figure 7B:
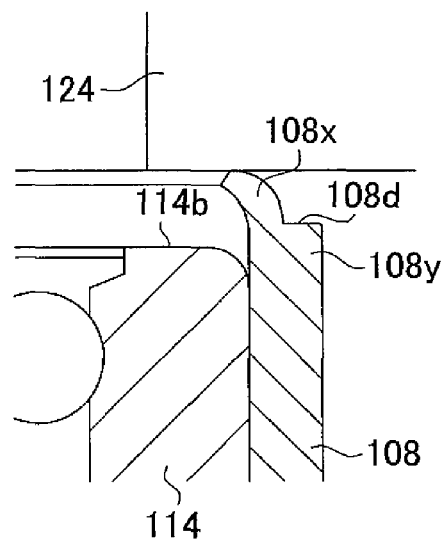
Figure 7C:
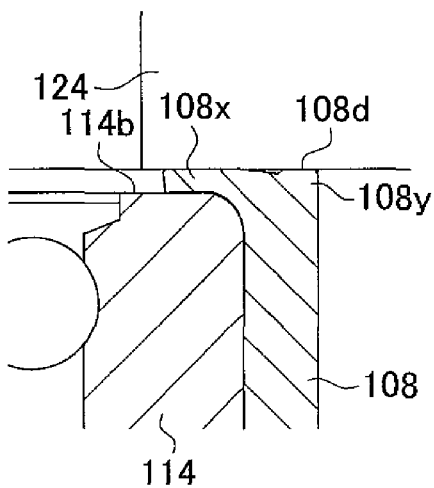
Figure 7D:
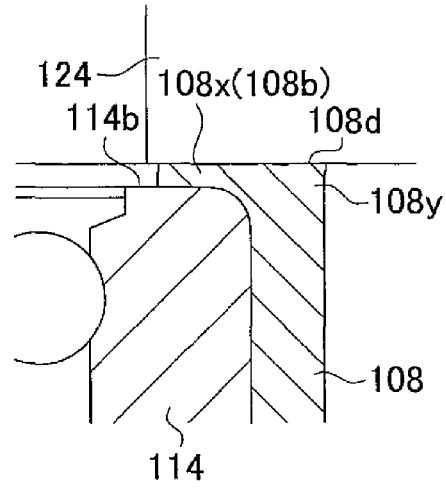

Using this bearing holder 108, as shown in FIGS. 7B to 7D, the caulking process is carried out with the aid of rollers 124 forming stepless cylindrical outer peripheral surfaces as in the case of the first embodiment of the invention. In the final stage of the caulking process, a pressure is applied to the pressure receiving surface 108d of the pressure receiving shoulder portion 108y as shown in FIGS. 7C and 7D.

In this embodiment of the invention, because no gap is provided between the end 108x and the pressure receiving shoulder portion 108y, the effect of absorbing radially inward plastic flow decreases correspondingly. However, because the pressure receiving surface 108d of the pressure receiving shoulder portion 108y is set higher than an end surface 114b of a bearing 114, plastic flow is absorbed correspondingly. As a result, an effect of preventing the bearing 114 from being radially strained is exerted.

Figure 8:
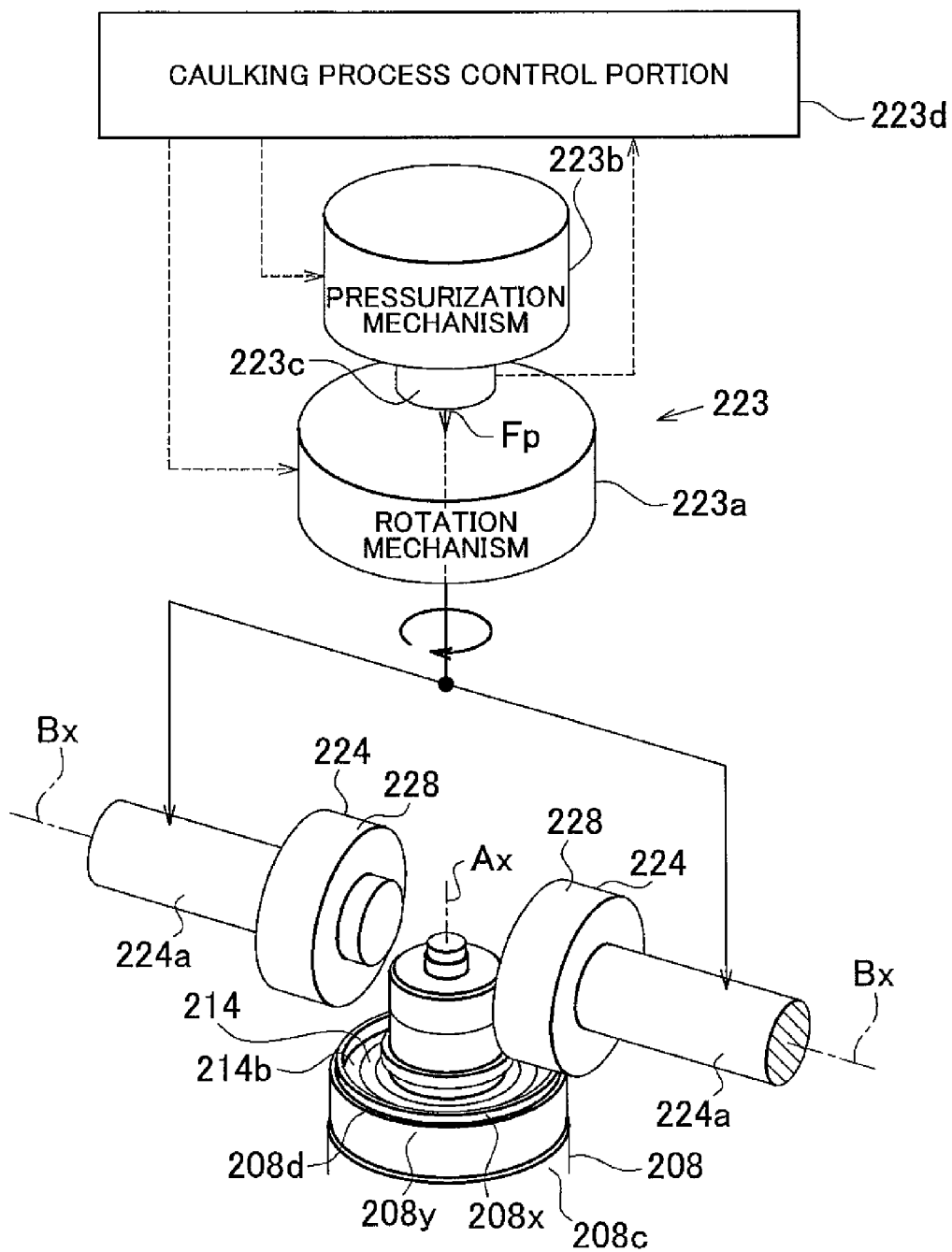
FIG. 8 is an explanatory view of the configuration of a caulking apparatus according to the third embodiment of the invention.

The other effects are the same as described in the first embodiment of the invention. In the third embodiment of the invention, a caulking process is carried out using a caulking apparatus 223 shown in FIG. 8. Two caulking rollers 224 are arranged to face each other at phase intervals of 180° around an axis Ax of a bearing holder 208 arranged on a work mount. The axis of rotation Bx common to the two caulking rollers 224 is perpendicular to the axis Ax of the bearing holder 208.

These caulking rollers 224 are lowered along the axis Ax of the bearing holder 208 to bring cylindrical caulking surfaces 228 formed on outer peripheries of the caulking rollers 224 into contact with an end 208x of the bearing holder 208. The caulking rollers 224 are then rotated around the axis Ax of the bearing holder 208 by a rotation mechanism 223a provided in the caulking apparatus 223. Through the rotation of the caulking rollers, a pressure is applied to rotational shaft bodies 224a of the caulking rollers 224 from a pressurization mechanism 223b installed in the caulking apparatus 223, downward along the axis Ax of the bearing holder 208.

The pressurization mechanism 223b is provided with a pressure generation device for generating a hydraulic pressure or the like and a pressure adjustment mechanism. The pressure adjustment mechanism applies a caulking load Fp required for the caulking process to the caulking rollers 224. This caulking load Fp (N) may be detected by a process measurement portion 223c to be used for an automatic processing by a caulking process control portion 223d. Furthermore, in the process measurement portion 223c, a caulking stroke Lp (mm), namely, a moving amount of the process rollers 224 in the direction of the axis Ax of the bearing holder 208 is also detected to be output to the caulking process control portion 223d.

The caulking rollers 224 are supported around the axis Bx rotatably around their own axes via the rotational shaft bodies 224a respectively and hence are rotated around their own axes while revolving around the axis Bx through caulking process. That is, the caulking rollers 224 are rolled.

The shapes of the end 208x of the bearing holder 208 and the pressure receiving shoulder portion 208y of the bearing holder 208 are the same as shown in the first embodiment or the second embodiment of the invention. Accordingly, the caulking rollers 224 are brought into contact with the end 208x of the bearing holder 208 as described above, then brought into contact with the pressure receiving surface 208d of the pressure receiving shoulder portion 208y in the final stage of the caulking process, and rolled, and the caulking process as described in the first embodiment or the second embodiment of the invention is thereby be carried out.

Figure 9:
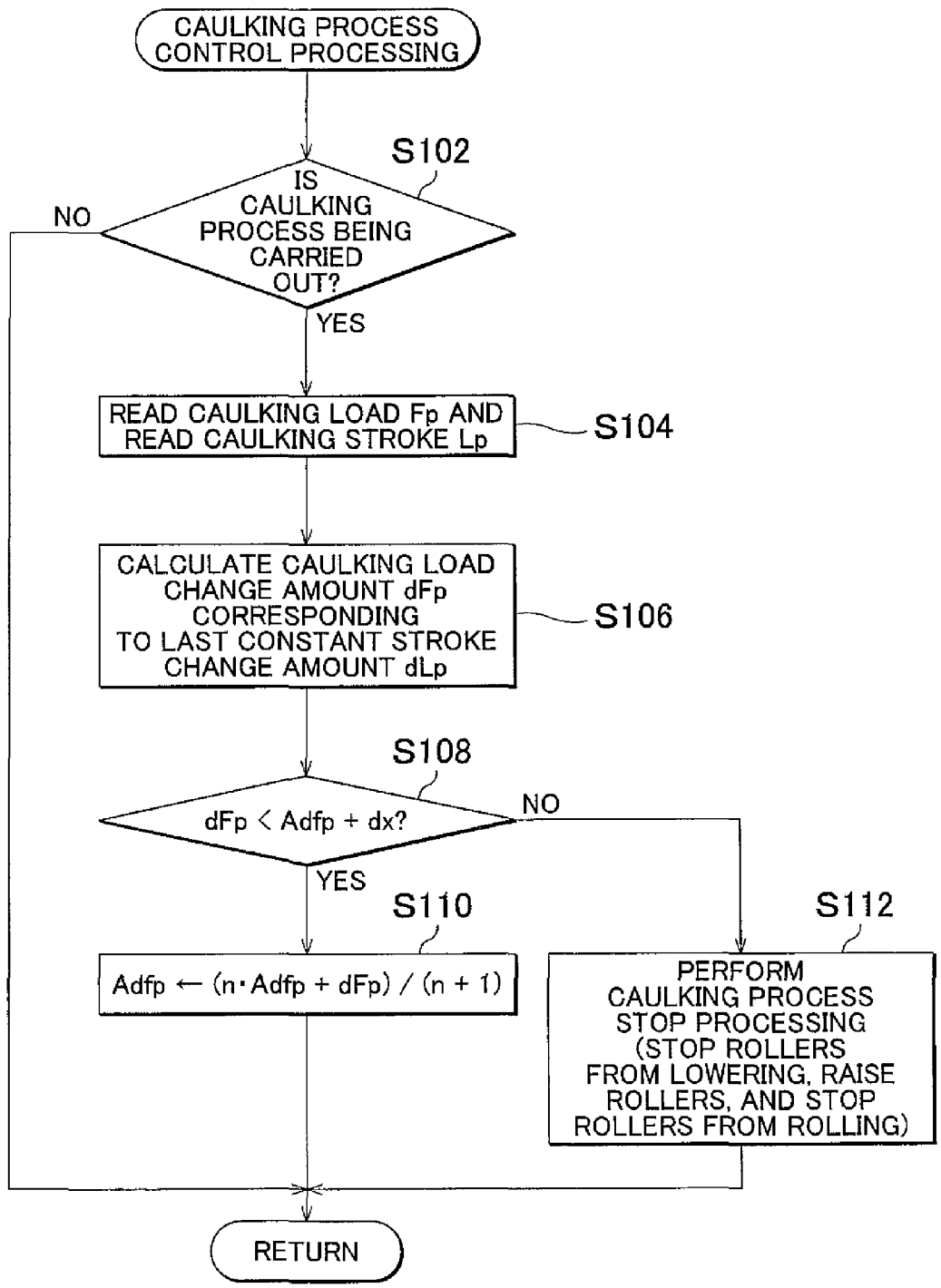
FIG. 9 is a flowchart of a caulking control process performed by the caulking apparatus according to the third embodiment of the invention.

It should be noted herein that the caulking process control portion 223d is mainly constituted by a microcomputer. A flowchart of FIG. 9 shows a caulking control process executed by the caulking process control portion 223d. The process is executed at predetermined intervals. It should be noted that the steps in the flowchart corresponding to individual processing contents are denoted by "S~" respectively.

When the present processing is started, it is first determined whether the caulking process is being carried out (S102). If the caulking process is not being carried out (NO in S102), the present processing is immediately terminated. If the caulking apparatus 223 is operated to start the caulking process, the caulking process is being carried out (YES in S102). Accordingly, the caulking load Fp and the caulking stroke Lp, which are detected by the process measurement portion 223c, are then read into a working area provided in a transient memory of the caulking process control portion 223d (S104).

A caulking load change amount dFp for a last constant stroke change amount dLp (e.g., a stroke change amount of 0.1 mm) is then calculated (S106). That is, the difference between the caulking load Fp after the caulking rollers 224 are lowered by a predetermined stroke and the caulking load Fp before the caulking rollers 224 are lowered is calculated as the caulking load change amount dFp. The caulking load change amount dFp is calculated using formula 1 (S108).

$$dFp < Adfp + dx \quad \text{(Formula 1)}$$

The right side of the formula 1 represents a value larger than a later-described caulking load change amount moving average Adfp by a divergence amount dx. That is, the formula 1 is used to determine whether the caulking load change amount dFp is smaller than the sum of the caulking load change amount moving average Adfp and the divergence amount dx.

Figure 10A:
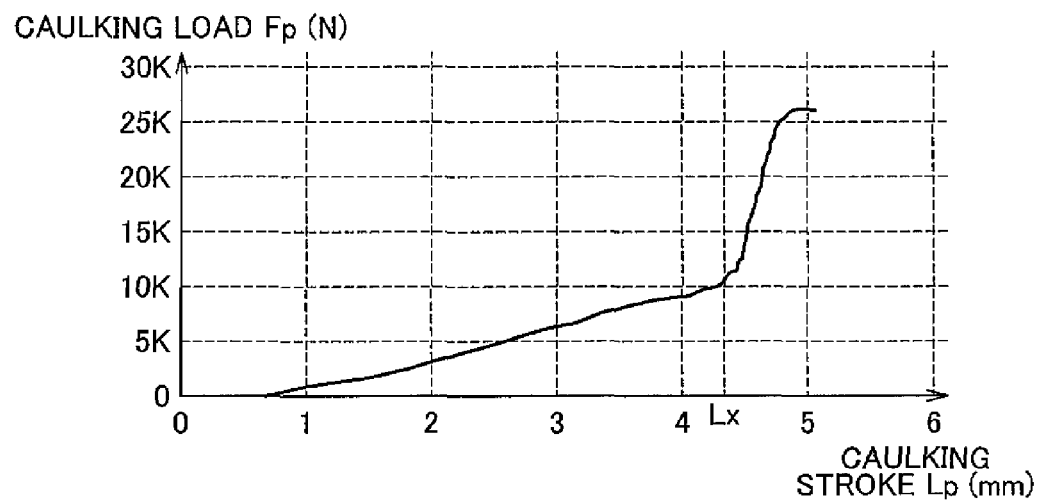
FIG. 10 is composed of graphs showing how the caulking load and the caulking torque change with respect to a caulking stroke in the caulking apparatus according to the third embodiment of the invention.

More specifically, the caulking load Fp changes as shown in FIG. 10A as the caulking stroke Lp changes. In FIG. 10A, the caulking process is started slightly before the caulking stroke Lp becomes equal to 1 mm. After that, the caulking load Fp rises at a substantially constant gradient shortly after the caulking stroke Lp exceeds 4 mm. The constant change in the caulking load Fp at a substantially constant gradient arises in the course of bending the end 208x (8x, 108x) as shown in FIGS. 6B and 6C and FIGS. 7B and 7C.

Then, when the rollers 224 (24, 124) press the pressure receiving shoulder portion 208y (8y, 108y) as well to bring the end 208x (8x, 108x) into contact with the end surface 214b (14b, 114b) of the bearing 214 (14, 114) as shown in FIGS. 6C and 6D and FIGS. 7C and 7D, the caulking load Fp begins to increase abruptly as indicated by a stroke point Lx in FIG. 10A. Accordingly, when the caulking stroke Lp reaches this stroke point Lx, the caulking process is completed.

That is, the formula 1 serves to determine whether the stroke point Lx, where the caulking load Fp begins to increase abruptly, has been reached. In this case, if the relationship dFp<Adfp+dx is satisfied (YES in S108), the caulking stroke Lp has not reached the stroke point Lx. Accordingly, the caulking load change amount moving average Adfp is calculated using formula 2 (S110).

$$Adfp \leftarrow (n \cdot Adfp + dFp)/(n+1) \quad \text{(Formula 2)}$$

It should be noted herein that the caulking load change amount moving average Adfp on the right side of Formula 2 is a value calculated during the previous control cycle (a value used in the last step S108), and that the caulking load change amount moving average Adfp on the left side is a currently updated value. The value n representing number of times is set to, for example, 10. It should be noted that the calculation according to formula 2 may be made immediately before step S108.

The present process is thus terminated. After that, when the caulking process is being carried out and formula 1 continues to be satisfied in the subsequent caulking control process (YES in S108), the caulking load change amount moving average Adfp continues to be calculated according to formula 2 (S110).

Then, when the caulking stroke reaches the stroke point Lx, where the relationship dFp≥Adfp+dx is satisfied (NO in S108), a caulking stop process is executed (S112). In the caulking stop process, more specifically, the application of the pressure to the bearing holder 208 is stopped by raising the caulking rollers 224, and the caulking rollers 224. Furthermore, the rolling of the caulking rollers 224 by the rotation mechanism 223a is stopped.

Due to the execution of the caulking stop process as described above, the caulking process is not being carried out (NO in S102) in the subsequent caulking control process. Therefore, the present processing is terminated. Further, when the caulking process is next carried out, the result of the determination in step S102 is YES. Then in the process as described above, press and rolling are continued by the caulking rollers 224 until the caulking process is completed.

In the above configuration, the rotation mechanism 223a and the pressurization mechanism 223b are equivalent to the rolling pressurization unit, and the process measurement portion 223c is equivalent to the caulking process load state detection unit. The caulking process control portion 223d is equivalent to the specific change detection unit and the process changing unit. Steps S104, S106, S108, and S110 of the caulking control process (FIG. 9) are equivalent to the processes executed by the specific change detection unit, and step S112 is equivalent to the process executed by the process changing unit.

According to the third embodiment of the invention, the following effects are obtained. 1) In accordance with the construction of the bearing holder used for the caulking process, the effects of the first embodiment or the second embodiment of the invention are obtained.

2) When the end 208x of the bearing holder 208 is subjected to the caulking process, the caulking apparatus 223 changes the caulking process for the bearing holder 208 at a timing at which a specific change occurs that indicates the bearing 214 begins to be strained. More specifically, the caulking process is terminated.

Thus, by reducing the pressure for the caulking process or stopping the caulking process, increases in the amount of plastic deformation resulting from application of the pressure to the pressure receiving shoulder portion 208y may be prevented.

Accordingly, the caulking apparatus 223 may reliably restrain the bearing 214 from being radially strained as a result of application of the pressure in carrying out the caulking process. In the fourth embodiment of the invention, the caulking control process shown in FIG. 11 is performed at predetermined intervals. Furthermore, a process measurement portion that detects the caulking stroke Lp (mm) and the caulking torque Tp (N·m) is employed as the process measurement portion 223c. The caulking torque Tp is applied to the bearing holder 208 when the caulking rollers 224 rotate around the axis Ax of the bearing holder 208 by means of the rotation mechanism 223a. It should be noted that the energy for rotating the rotation mechanism 223a at a constant speed, namely, the electric power supplied to an electric motor, may be used as a value indicative of the caulking torque Tp instead of detecting the caulking torque Tp using the process measurement portion 223c. The fourth embodiment of the invention is identical to the third embodiment of the invention in other structural details. Therefore, the caulking control process (FIG. 11) will be described with reference to FIGS. 8 and 10.

When the present process is started, it is first determined whether the caulking process is being carried out (S202). If the caulking process is not being carried out (NO in S202), the present processing is immediately terminated. If the caulking apparatus 223 is operated to start the caulking process (YES in S202), the caulking torque Tp and the caulking stroke Lp, which are detected by the process measurement portion 223c, are then stored into the working area of the memory (S204).

A caulking torque change amount dTp for the previous constant stroke change amount dLp (e.g., the stroke change amount of 0.1 mm) is then calculated (S206). The caulking torque change amount dTp is calculated using formula 3 (S208).

$$dTp > Bdtp - dy \qquad \text{(Formula 3)}$$

The right side of formula 3 represents a value smaller than a later-described caulking torque change amount moving average Bdtp by a divergence amount dy. That is, formula 3 is used to determine whether the caulking torque change amount dTp exceeds a value obtained by subtracting the divergence amount dy from the caulking torque change amount moving average Bdtp.

Figure 10B:
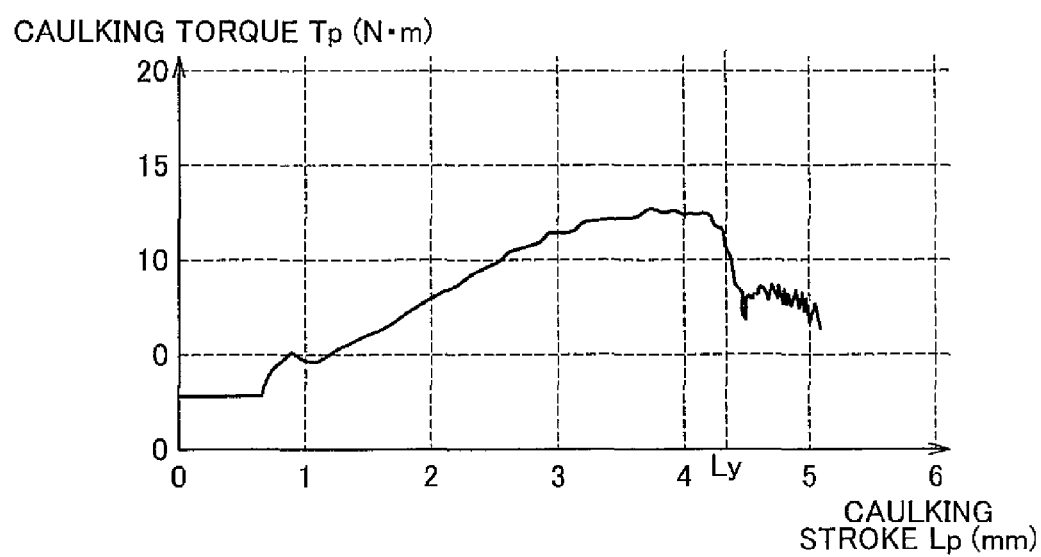
Figure 11:
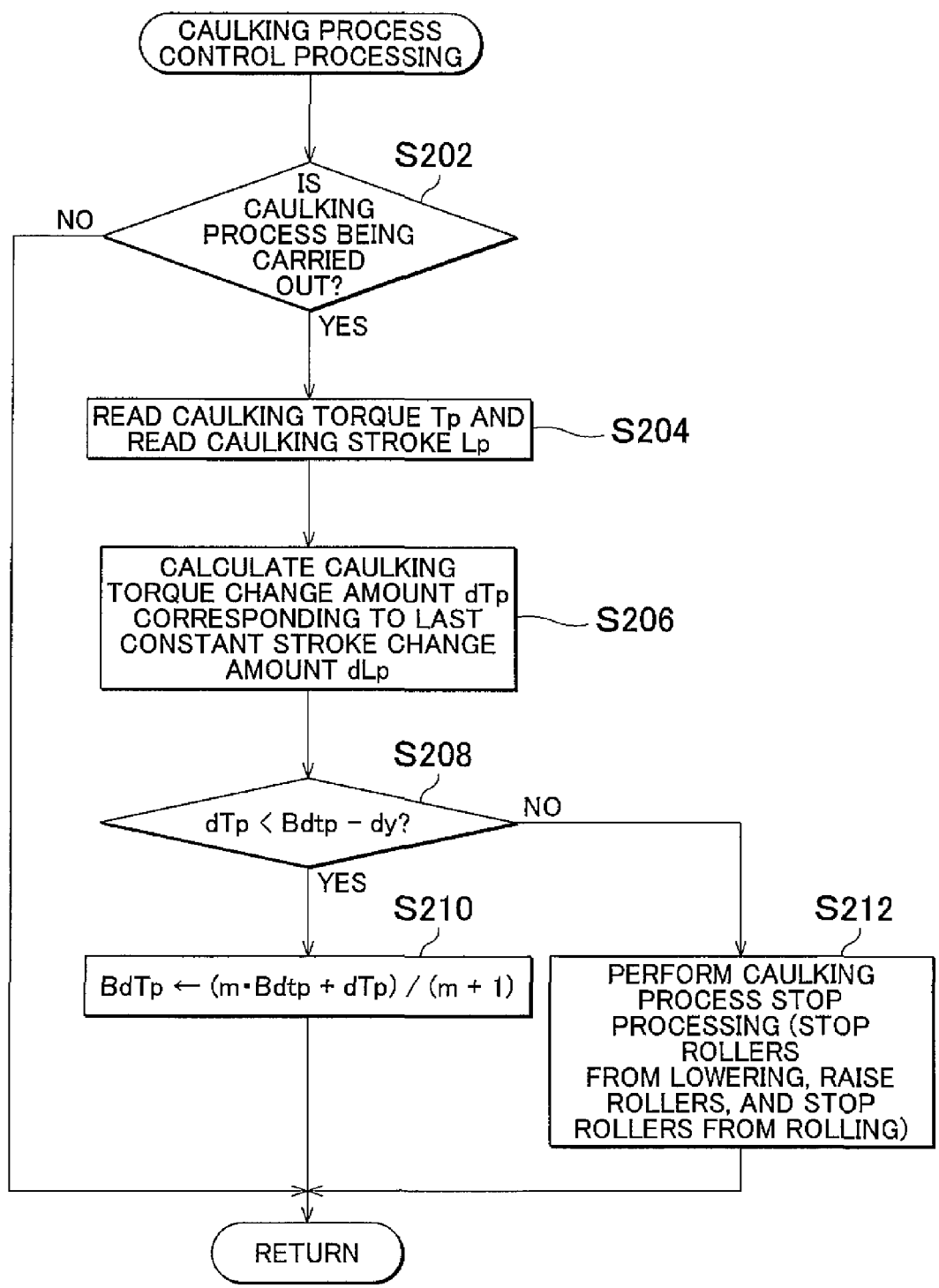
FIG. 11 is a flowchart of a caulking control process executed by a caulking apparatus according to the fourth embodiment of the invention.

More specifically, the caulking torque Tp changes as shown in FIG. 10B as the caulking stroke Lp changes. In FIG. 10B, the caulking torque Tp changes without drastically decreasing from the start of the caulking process shortly after the caulking stroke Lp exceeds 4 mm. This arises in the course of bending the end 208x (8x, 108x) as shown in FIGS. 6B and 6C and FIGS. 7B and 7C.

Then, when the end 208x (8x, 108x) comes into contact with the end surface 214b (14b, 114h) of the bearing 214 (14, 114) as shown in FIGS. 6C and 6D and FIGS. 7C and 7D, the caulking torque Tp starts abruptly decreasing as indicated by a stroke point Ly in FIG. 10B. This indicates that the bending of the end 208x of the bearing holder 208 and plastic deformation of the pressure receiving shoulder portion 208y are terminated to cause a decrease in the resistance against the rolling of the caulking rollers 224. Accordingly, when the caulking stroke Lp reaches this stroke point Ly, the caulking process is completed.

That is, formula 3 is used to determine whether the caulking stroke Lp has reached the stroke point Ly, where the caulking torque Tp begins to decrease abruptly. The stroke position is substantially the same as the stroke point Lx, as shown in FIG. 10A.

In this case, if the relationship dTp>Bdtp−dy is satisfied (YES in S208), the caulking stroke Lp has not reached the stroke point Ly. Accordingly, the caulking torque change amount moving average Bdtp is then calculated using formula 4 (S210).

$$BdTp \leftarrow (m \cdot Bdtp + dTp)/(m+1) \qquad \text{(Formula 4)}$$

It should be noted herein that the caulking torque change amount moving average Bdtp on the right side is a value calculated during the previous control cycle (a value used in a step S208 executed previously), and that the caulking torque change amount moving average Bdtp on the left side is the current value. A value m representing number of times is set to, for example, 10. It should be noted that the calculation according to formula 4 may be made immediately before step S208.

After that, when the caulking process is being carried out and formula 3 continues to be satisfied (YES in S208), the caulking torque change amount moving average Bdtp continues to be calculated according to formula 4 (S210).

Then, when the caulking stroke Lp reaches the stroke point Ly where the relationship dTp≤Bdtp−dy is satisfied (NO in S208), the caulking stop process is executed (S212). The caulking stop process is the same as that described in step S112 of the third embodiment of the invention.

In the above configuration, steps S204, S206, S208, and S210 of the caulking control process (FIG. 11) are equivalent to the processes executed by the specific change detection unit, and step S212 is equivalent to the process executed by the process changing unit.

As described above, in this embodiment of the invention, the determination of whether to stop the caulking process is based on the caulking torque change amount dTp. The effects described in the third embodiment of the invention are obtained from this as well.

In the fifth embodiment of the invention, the caulking stop process (S112, S212) executed in the caulking control process (FIGS. 9 and 11) differs in that the caulking process continues for a brief period before the caulking stop process is executed as described above.

Figure 12:
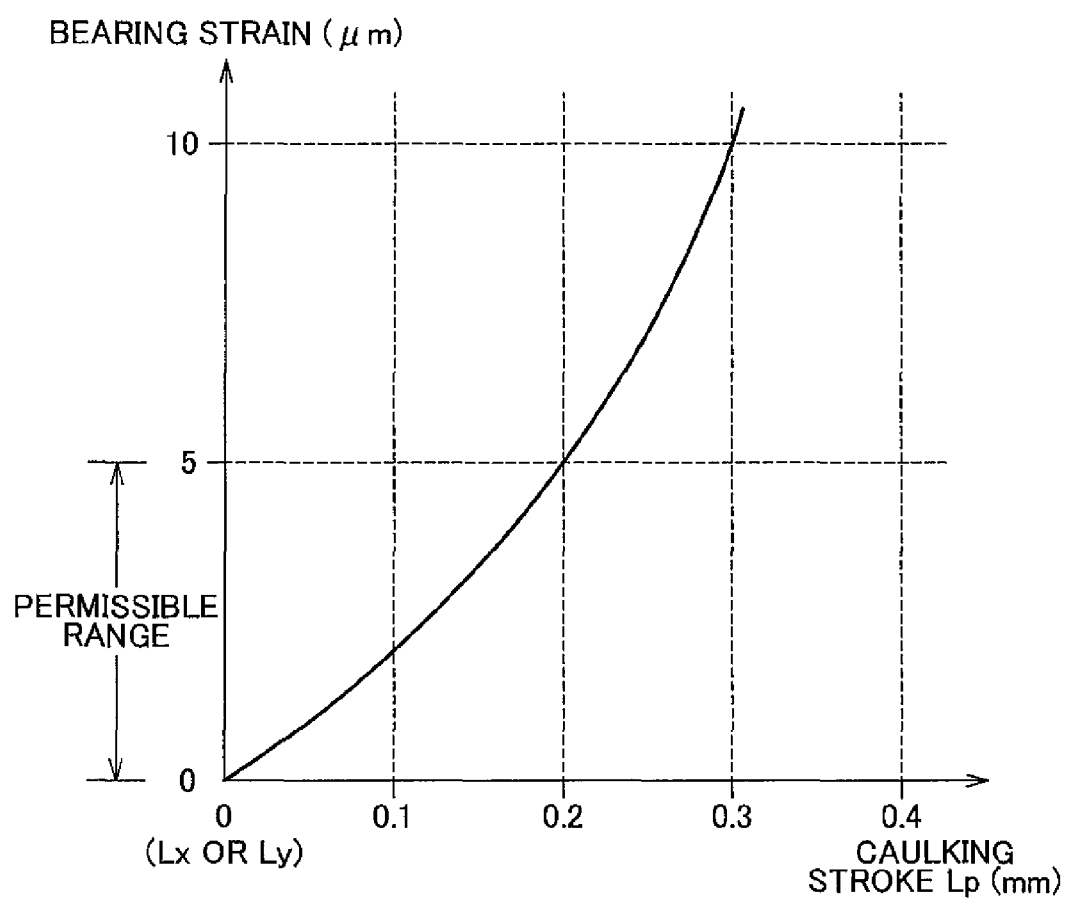
FIG. 12 is a graph used in a caulking apparatus according to the fifth embodiment of the invention and showing the relationship between a caulking stroke and a bearing strain.

That is, as shown in FIG. 12, when the caulking process progresses beyond the stroke point Lx, Ly (the origin in FIG. 12), the strain of the bearing 214 is caused and increased as the caulking stroke Lp increases. If the strain of the bearing 214 is within a permissible range, it is preferable, in view of various errors during the process, to stop the caulking process after the caulking stroke Lp slightly exceeds the stroke point Lx, Ly, so that the bearing 214 is held with a sufficient clamping force.

For example, if the permissible range of the strain of the bearing 214 is equal to or smaller than 5 μm, it was experimentally determined that the caulking stroke Lp may exceed the stroke point Lx or Ly by 0.2 mm. Accordingly, a shift to the caulking stop process (S112, S212) is made after the caulking stroke Lp exceeds the stroke point Lx, Ly by a value smaller than 0.2 mm, for example, 0.1 mm.

Thus, the effects of the third embodiment of the invention or fourth embodiment of the invention are achieved, and the caulking process may be reliably carried out in view of various errors during the caulking process. Modified examples will be described hereinafter. (a) In each described embodiment of the invention, the caulking apparatus includes two caulking rollers arranged around the axis of the bearing holder at phase intervals of 180°. However, the caulking apparatus may have only one caulking roller. Alternatively, a caulking apparatus having three caulking rollers arranged at phase intervals of 120° or a caulking apparatus having four caulking rollers arranged at phase intervals of 90° may be employed.

(b) In each of the described embodiments, the outer race of the bearing is clamped by the bearing holder. However, it is also appropriate to adopt a structure in which the caulked portion is formed directly on the housing through a caulking process and the outer race of the bearing is directly held by the housing instead of using the bearing holder. In this case as well, an effect similar to that of the case where the pressure receiving shoulder portion is formed on the housing and held by the bearing holder as described above through application of the pressure is obtained.

In each embodiment of the invention, the pressure receiving shoulder portion is described as being formed on the bearing holder or the housing for the purpose of application of the pressure. However, if the bearing holder or the housing already has a region to which a pressure may be applied in the direction of the clamping force of the outer race, that region may be utilized as the pressure receiving shoulder portion instead.

Further, the pressure receiving shoulder portion is pressed by the same rollers as the caulking rollers for subjecting the end to the caulking process. However, the pressure receiving shoulder portion may be pressed by a different type of pressurization mechanism. Even if the same caulking rollers as described above are used, the rollers may have a caulking surface and a pressurization surface that are different in level from each other instead of having a stepless cylindrical surface.

(d) In each of the above-described caulking control processes, the caulking load change amount moving average Adfp (FIG. 9: S110) or the caulking torque change amount moving average Bdtp (FIG. 11: S210) is calculated, and the caulking process stop process is started when the difference between the latest caulking load Fp or the latest caulking torque Tp and the moving average value exceeds the divergence amount dx or dy. Instead of calculating the moving average value and making a determination as described above, it is also appropriate to provide a filter circuit to filter a signal output from the process measurement portion 223c and make a determination on a sudden change in the caulking load Fp or the caulking torque Tp in accordance with the filtered signal.

(e) In each of the foregoing embodiments of the invention, the variable valve operating mechanism that adjusts the maximum valve lift amount of each intake valve provided in the internal combustion engine is employed as the mechanism driven by the rotation-translation conversion actuator. However, a variable valve operating mechanism capable of continuously adjusting the maximum valve lift amount of each exhaust valve provided in the internal combustion engine may be employed instead. Furthermore, a mechanism other than the variable valve operating mechanism may be employed as the mechanism driven by the rotation-translation conversion actuator. Further, this mechanism may not necessarily be used for the internal combustion engines.

(f) In each of the described embodiments of the invention, the planetary differential screw type rotation-translation converter is adopted as the rotation-translation converter. However, a different type of rotation-translation converter such as a feed screw mechanism may be employed.

(g) As described in FIG. 4 of the first embodiment of the invention, the strain toward the outer race 14a side of the bearing 14, which is caused through pressurization of the pressure receiving surface 8d, is absorbed by the range I including the rounded region R of the corner portion of the outer race 14a. Accordingly, the creation of a strain leading to an increase in the rotation resistance of the bearing 14 can also be suppressed by setting the height of the pressure receiving surface 8d higher than a lowest position of this rounded region R.

What is claimed is:

1. A caulked retaining member that is bent at one end through a caulking process to form a caulked portion and holds a member along a base of the caulked retaining member by a clamping force of the caulked portion, wherein:
   the base has a pressure receiving shoulder portion, which receives a pressure of the caulking process in a same direction as a direction of the clamping force, and the pressure receiving shoulder portion is formed coaxially outside with respect to a bent end and adapted to absorb the pressure of the caulking process by a strain; and
   a groove is formed between the bent end and the pressure receiving shoulder portion.

2. The caulked retaining member according to claim 1, wherein:
   the member is a bearing; and
   the caulked retaining member is one of: (1) a housing that accommodates therein a rotary member rotatably supported by the bearing, and (2) a bearing holder arranged in a housing that accommodates therein a rotary member rotatably supported by the bearing.

3. The caulked retaining member according to claim 2, further comprising:
   a rotation-translation conversion actuator, wherein:
   the bearing is a bearing of the rotation-translation conversion actuator, and
   the one of the housing and the bearing holder, is a housing or a bearing holder of the rotation-translation conversion actuator; and
   when the caulked retaining member is the housing of the rotation-translation conversion actuator, the housing is mounted on a driven object device, the rotation-translation conversion actuator also includes an output shaft, which moves in an axial direction of the caulked retaining member through rotation of the rotary member, and protrudes outward from the housing to transmit a driving force from the output shaft to the driven object device.

4. The caulked retaining member according to claim 3, wherein:
   the rotary member is a nut of a planetary differential screw type rotation-translation converter;
   the output shaft is a sun shaft;
   a planetary shaft is arranged between the nut and the sun shaft; and
   the sun shaft and the planetary shaft mesh with the nut in a manner to perform rotation-translation conversion.

5. The caulked retaining member according to claim 3, wherein the driven object device is an internal combustion engine.

6. A method for retaining a member by caulking, comprising:
   bending an end of the caulked retaining member according to claim 1 along a corner portion of the member by a caulking surface of a caulking roller to form a caulked portion, and the member is held along a base of the caulked retaining member by a clamping force of the caulked portion; and
   applying a pressure to the pressure receiving shoulder portion in the same direction as the direction of the clamping force during the caulking process.

7. The method according to claim 6, wherein the caulking roller applies the pressure to the pressure receiving shoulder portion in the same direction as the direction of the clamping force.

8. The method according to claim 7, wherein the caulking surface formed on the caulking roller and a pressing surface for applying the pressure to the pressure receiving shoulder portion are formed as a stepless cylindrical surface.

9. A structure of caulking retaining member having the member held in the caulked retaining member by the method according to claim 6.

10. A caulked retaining member that that is bent at one end through a caulking process to form a caulked portion and holds a member along a base of the caulked retaining member by a clamping force of the caulked portion, wherein:

the base has a pressure receiving shoulder portion, which receives a pressure in a same direction as a direction of the clamping force, and is formed coaxially on the outside of a bent side of the end; and the pressure receiving shoulder portion has a pressure receiving surface set at such a position that no pressure is applied to the member as a result of plastic deformation of the caulked portion in a direction perpendicular to the direction of the clamping force.

11. The caulked retaining member according to claim 10, wherein the pressure receiving surface of the pressure receiving shoulder portion is set higher than the member.

* * * * *